(12) United States Patent
Garusi et al.

(10) Patent No.: US 11,040,891 B2
(45) Date of Patent: Jun. 22, 2021

(54) METHOD FOR DOSING REAGENTS IN WATER DISINFECTION PLANTS

(71) Applicant: SANIPUR S.R.L., Brescia (IT)

(72) Inventors: Gianfranco Garusi, Brescia (IT); Francesco Garusi, Brescia (IT); Stefano Melada, Brescia (IT)

(73) Assignee: SANIPUR S.R.L., Brescia (IT)

(*) Notice: Subject to any disclaimer, the term of this patent is extended or adjusted under 35 U.S.C. 154(b) by 82 days.

(21) Appl. No.: 15/804,249

(22) Filed: Nov. 6, 2017

(65) Prior Publication Data

US 2018/0127287 A1 May 10, 2018

(30) Foreign Application Priority Data

Nov. 7, 2016 (IT) .......................... 102016000111728

(51) Int. Cl.

| | |
|---|---|
| *C02F 1/00* | (2006.01) |
| *C02F 1/76* | (2006.01) |
| *C02F 1/50* | (2006.01) |
| C02F 103/02 | (2006.01) |
| C02F 103/42 | (2006.01) |

(52) U.S. Cl.
CPC ............ *C02F 1/008* (2013.01); *C02F 1/50* (2013.01); *C02F 1/76* (2013.01); *C02F 2103/023* (2013.01); *C02F 2103/42* (2013.01); *C02F 2209/005* (2013.01); *C02F 2209/04* (2013.01); *C02F 2209/14* (2013.01); *C02F 2209/29* (2013.01); *C02F 2209/44* (2013.01); *C02F 2301/046* (2013.01); *C02F 2303/04* (2013.01)

(58) Field of Classification Search
None
See application file for complete search history.

(56) References Cited

U.S. PATENT DOCUMENTS

| | | | | |
|---|---|---|---|---|
| 6,125,481 | A | * | 10/2000 | Siciliano ................ C02F 1/008 210/143 |
| 2006/0096930 | A1 | | 5/2006 | Beardwood |
| 2010/0206815 | A1 | | 8/2010 | Garusi et al. |
| 2014/0342020 | A1 | | 11/2014 | Forstmeier |
| 2015/0203388 | A1 | | 7/2015 | Gotthardt et al. |

FOREIGN PATENT DOCUMENTS

EP          2 944 615 A1      11/2015

OTHER PUBLICATIONS

Italian Search Report for corresponding Italian Patent Application No. 102016000111728 dated Jun. 6, 2017, 11 pages.

* cited by examiner

*Primary Examiner* — Richard C Gurtowski
(74) *Attorney, Agent, or Firm* — Merchant & Gould P.C.

(57) ABSTRACT

The present invention relates to a method for dosing reagents in water disinfection plants, wherein said method comprises adding said reagents in said plants in amounts defined on the basis of a parameter established a priori as a function of the following parameters: plant volume and/or frequency of use of the plant and/or characteristics of the fresh water introduced therein, said amounts being corrected with a correction factor established following a comparison carried out between the levels of said reagents as actually measured in circulation and reference values.

5 Claims, 3 Drawing Sheets

METHOD FOR DOSING REAGENTS IN WATER DISINFECTION PLANTS

This application claims benefit of Ser. No. 102016000111728, filed 7 Nov. 2016 in Italy and which application is incorporated herein by reference. To the extent appropriate, a claim of priority is made to the above disclosed application.

BACKGROUND OF THE INVENTION

The present invention relates to a method for fine control of the disinfection of domestic hot water carried out with chemical substances.

Hot water employed for hygienic and sanitary uses, but also for technical, industrial and zootechnical uses, can contain microorganisms that are dangerous for human health, for example *Legionella* present in hot water and responsible for a bacterial infection, Legionellosis, which can affect humans with a high mortality rate, in particular in hospital environments.

*Legionella* bacterial proliferation is particularly critical at constant environmental conditions, for example in hospitals, hotels, ships, swimming pools and the like where water is maintained hot within a constant temperature range and it often stagnates in the piping.

Several methods for contrasting *Legionella* and decontaminate contaminated hydraulic systems are known.

Among the chemical methods, the use of monochloroamine ($NH_2Cl$) or of chlorine dioxide ($ClO_2$) seems effective.

A problem associated with the use of chemical substances is tied to control over the concentration of the substance and of its decomposition by-products, in particular ammonium ions ($NH_4^+$) using monochloroamine, rather than chlorites and chloride with the use of chlorine dioxide.

Said decomposition products, when present in amounts above maximum values defined as threshold values, have a negative impact on human and animal health. Current standards strictly regulate and define these values.

It is significant that the main undesired degradation products are the reagents themselves, i.e. the main decomposition path is the inverse reaction to the synthesis.

The problem of the degradation of the disinfectant substance is all the more sensitive in said hot water recirculation systems, for example in hospitals and in swimming pools, where only a part of the water where the disinfectant substance has been added is withdrawn, while the remaining part continues to circulate in the system and is re-heated cyclically, promoting the thermal decomposition of the disinfectant substance present in the system and requiring the addition of fresh water. This exacerbates the problem of changes in the concentration of the disinfectant substance and of the excessive accumulation of decomposition by-products in the recirculated hot water.

MI2014A000898 describes a hot water recirculation plant, in which there is a strong need for monitoring the levels of disinfectant substance and of by-products thereof in the circuit.

An additional problem that is found is related to the variations due to the starting fresh water, where at the source the water may be treated more or less thoroughly with disinfectant, typically Chlorine ($Cl_2$), thereby altering the reaction equilibrium.

SUMMARY OF THE INVENTION

The purpose of the present invention therefore is to propose a method for fine control of the disinfection of domestic hot water carried out with chemical substances.

BRIEF DESCRIPTION OF THE DRAWINGS

Figure 1:
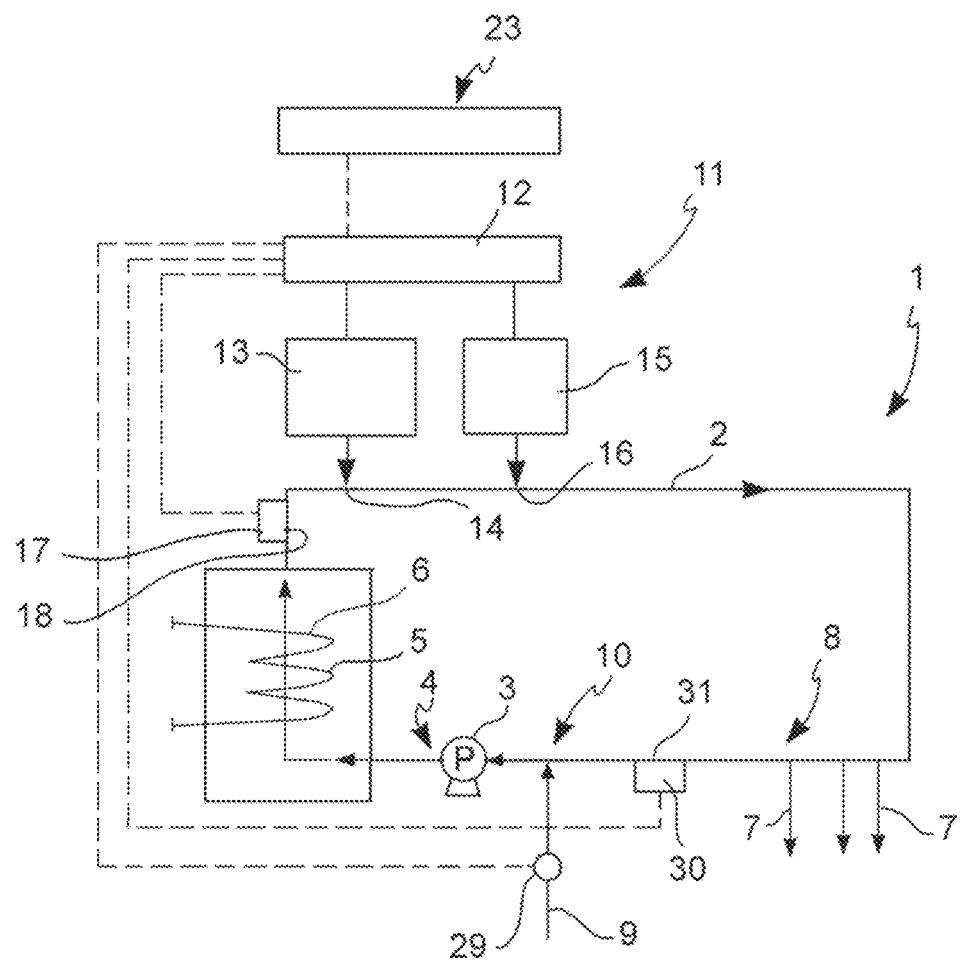

Description of the figures:

FIG. 1: schematic representation of a preferred embodiment of a plant in which the method according to the present invention is carried out.

Figure 2:
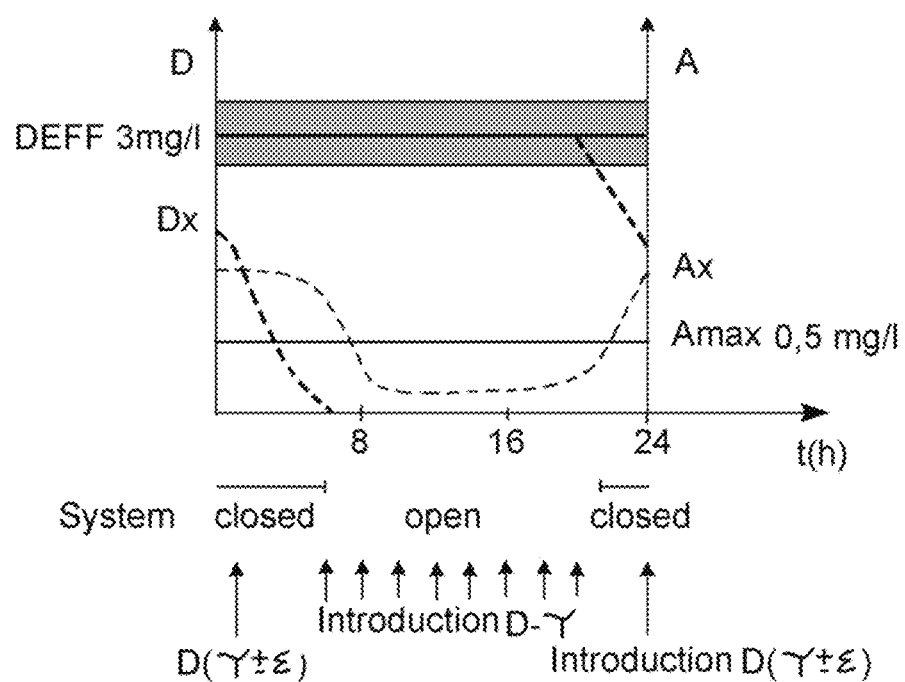

FIG. 2: explanatory curves of the circadian pattern of the levels of monochloroamine D and ammonium ion A in a domestic hot water plant.

Figure 3:
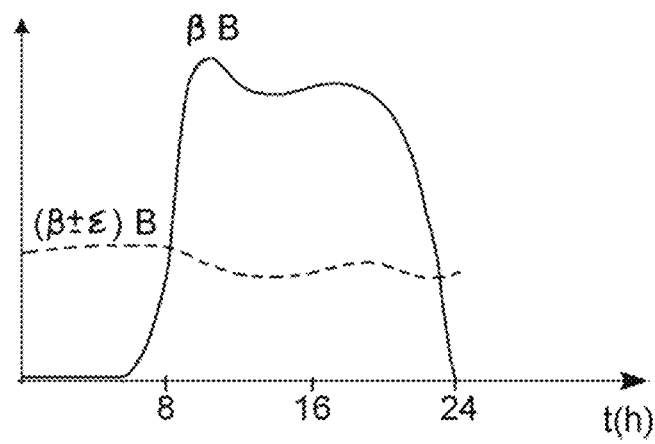

FIG. 3: curve that defines the optimal pattern of addition of the reagent/degradation product B into the circuit over 24 hours, where said B is hypochlorite and the disinfectant substance D utilized is monochloroamine, introduced already synthetized into the circuit. Solid line: theoretical addition. Dashed line: addition corrected by the correction factor ε.

Figure 4:
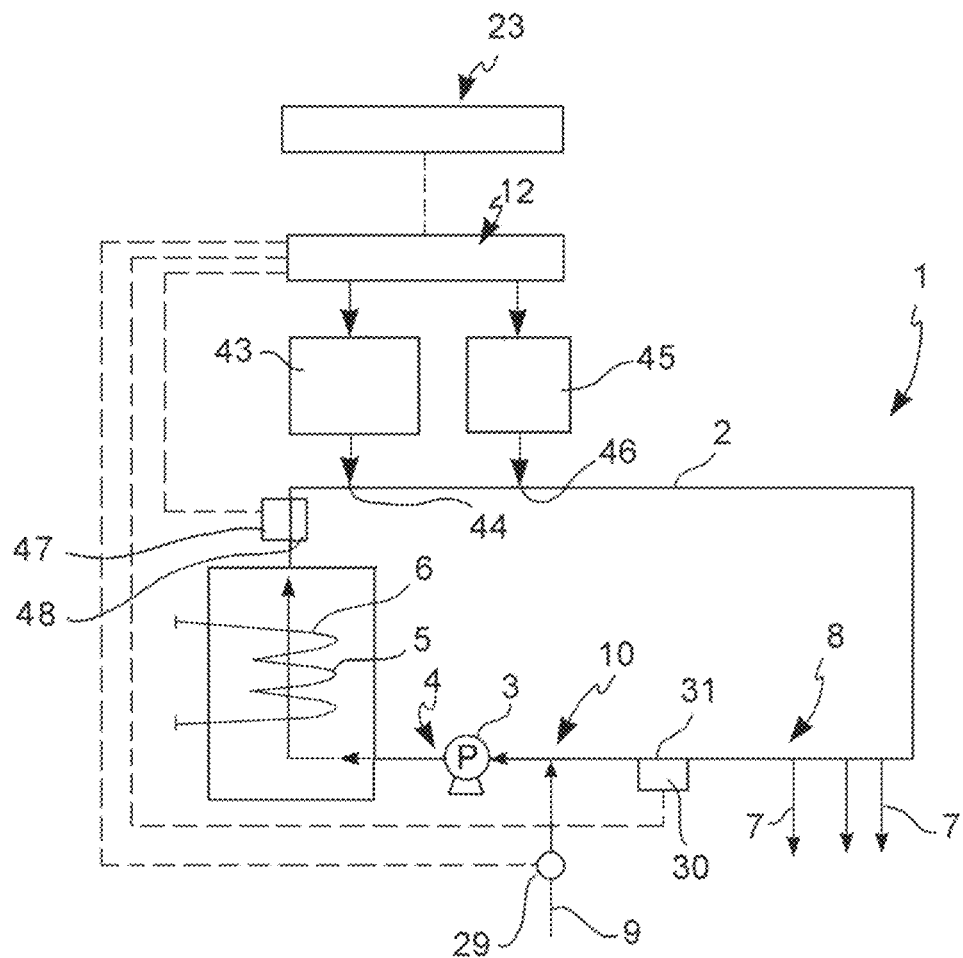

FIG. 4: schematic representation of an alternative embodiment of a plant in which the method according to the present invention is carried out.

Figure 5:
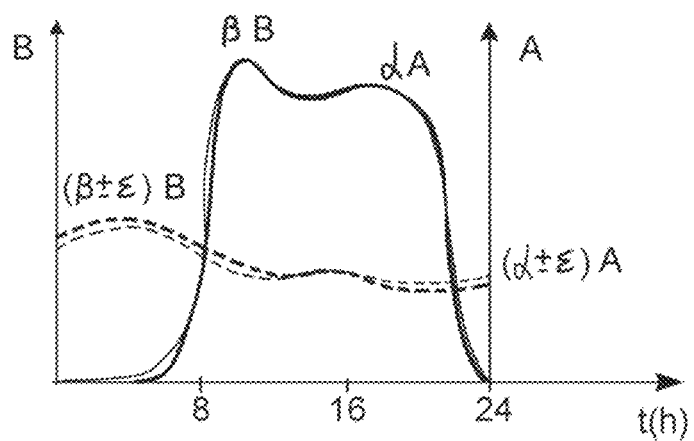

FIG. 5: curve defining the optimal pattern of addition of hypochlorite B and ammonium ions A into the circuit over 24 hours, where the disinfectant substance D is monochloroamine and it is generated directly within the circuit. Solid line: theoretical addition. Dashed line: addition corrected by the correction factor ε.

DETAILED DESCRIPTION OF THE PREFERRED EMBODIMENTS

Definitions:

"Fresh water" herein means water in the condition in which it is supplied by the water supply network, without the addition of any disinfectant substance other than those fed into it by the water supply network itself.

"Old water", for the purposes of the present invention, means water that remains heated in the pipelines for more than three hours.

"Disinfectant substance" means the chemical substance used to disinfect the hot water present in a hot water recirculation plant, where the same substance can be introduced into said plant as it is or, in an alternative embodiment, is generated within the plant itself, where into the plant are introduced the reagents that lead to the obtainment of said substance.

Said disinfectant substance, indicated with the letter D, is obtained starting from at least two starting reagents, with a reaction schematized as follows:

$$A+B \rightarrow D$$

In alternative embodiments, said reaction is of the type:

$$A+B+C \rightarrow D$$

Or of the following type $$A+B \rightarrow C+D$$

In a preferred embodiment, said disinfectant substance D is monochloroamine and it is obtained by means of the reaction:

$$NH_3+Cl_2 \leftrightarrow NH_2Cl+HCl$$

Since ammonia is not easy to handle, it is preferably replaced with ammonium salts, and gaseous chlorine is advantageously replaced by hypochlorites, according to the reaction:

$$NH_4Cl+NaOCl \leftrightarrow NH_2Cl+NaCl+H_2O$$

in which the only by-product is water.

In an additional embodiment, said disinfectant substance D is chlorine dioxide, obtained by reacting chlorite, preferably sodium chlorite, in the presence of acid, for example hydrochloric acid, according to the reaction:

$$5NaClO_2+4HCl \rightarrow 4ClO_2+5NaCl+2H_2O$$

Said degradation reaction is typically of the type: $D \rightarrow A + S_1 + \ldots + S_n$, where $S_1 + \ldots + S_n$ are other by-products.

Said degradation reaction is also of the type $D+B \rightarrow A + S_1 + \ldots + S_n$, where $S_1 + \ldots + S_n$ are other by-products.

In one embodiment, said disinfectant substance D is synthesized and then added into the circuit. Alternatively, said disinfectant substance D is synthesized within the circuit itself.

In the embodiment that comprises the use of monochloroamine, A is ammonium ion.

In the embodiment that comprises the use of chlorine dioxide, A is chlorite, which is further reduced to chloride ion.

In case of variations in fresh water due to an increased addition of chlorine or chlorine dioxide to the water supply network, an excess amount of the reaction product B, i.e. chlorites and/or hypochlorites will circulate.

The domestic hot water plant is a system that is open or closed cyclically, where said system is open in periods of water consumption and closed in periods of lack of use. Typically, said system is open during the day and closed at night. Typically, said system is open from approximately 7:00 AM to approximately 9:00 PM and closed from approximately 9:00 PM to approximately 7:00 AM.

In the circadian cyclicity described above, in said plant an accumulation of old water is observed starting from approximately 00:00 AM. Said old water is water enriched with the undesired degradation products $A, S_1, S_2, \ldots, S_n$, where the longer the time spent by the system in closed mode, the higher the concentration of said degradation products.

In said system, the effective concentration of said disinfectant substance D is $D_{EFF}$, where $D_{EFF}$ defines the range between $D_{min}$ and $D_{MAX}$.

In the same system, the threshold level for said reagents/degradation products A and B is, respectively, $A_{MAX}$ and $B_{MAX}$.

By way of example and with reference to FIG. 2, where said disinfectant substance D is monochloroamine and said reagent/degradation product A is ammonium ion, said monochloroamine is dosed in said system at an ideal concentration of approximately 3 mg/l. Continuously adding monochloramine D when said system is open and suspending said addition when said system is closed, said levels of monochloramine D measured in the system would follow the pattern described by the curve $D_x$ (dashed line), thus deviating from the desired range $D_{EFF}$ (shaded area), where $\delta D$ indicates said deviation of $D_x$ from the range $D_{EFF}$. Consequently, the levels of said reagent/degradation product A vary in said system according to the curve $A_x$ (dashed line). In particular, in the phase in which said system is closed, assuming a complete degradation of said monochloramine, said degradation product A in the closed system reaches levels of 1.04 mg/l. Since A is ammonium ion, said levels are higher than the limits imposed by law in relation to the maximum quantity of ammonium ions present in the domestic water, where said limit, indicated for the purposes of the present invention as $A_{MAX}$, is 0.5 mg/l (solid line).

Again by way of example, where to the fresh water is added in the water supply network with an amount of chlorine or chlorine dioxide, in the form of chlorites and/or hypochlorites, double relative to the amount typically introduced therein, introducing said fresh water into said circuit the levels of said chlorites and/or hypochlorites B in the water present in the circuit will inevitably be in excess, i.e. $B_x$ will be equal to $B_{MAX}+\delta B$.

Advantageously, the present invention describes a method to maintain effective levels of said disinfectant substance D in the system and/or to maintain said degradation products within the tolerability limits in each phase of said circadian cycle and taking into due consideration also the possible variations of the operations carried out in said fresh water upstream, for example at the water supply network.

Said method comprises the controlled addition in said system of only one of the reactants A or B so as to restore the reaction stoichiometry within the system itself to return the disinfectant substance D.

Said method also comprises, additionally or alternatively, the controlled addition of the substance D.

In an additional embodiment, said method also comprises, additionally or alternatively, unloading old water and loading fresh water into the system.

Where said disinfectant substance D is synthesized in the circuit, said one or more controlled additions are established in the amounts $\alpha A$ and $\beta B$, $\alpha A$ and $\beta B$ assuring the correct reaction stoichiometry.

Alternatively, said disinfectant substance D is introduced as it is into the circuit, and said one or more controlled additions are established in the amounts $\tau D$.

Said amounts $\alpha A$, $\beta B$, $\tau D$ are established a priori on the basis of the evaluation of the characteristics of the plant, where said evaluation is a function of at least the following parameters: plant volume and/or frequency of utilization of the plant and/or characteristics of the fresh water introduced therein.

Said amounts are corrected by a correction factor $\epsilon$, said correction factor $\epsilon$ being determined by the $\delta A$, $\delta B$ or $\delta D$ measured as indicated above.

In one preferred embodiment, said correction factor $\epsilon$ modifies by no more than 10% the predefined amount $\alpha A$ and/or $\beta B$ and/or $\tau D$. In a still more preferred embodiment, said correction factor $\epsilon$ changes by no more than 5% the predefined amount $\alpha A$ and/or $\beta B$ and/or $\tau D$ or, still more preferably, by no more than 1%.

Monitoring said levels $A_x$ and/or $B_x$ as described, a correction factor $\epsilon$ is defined, and said correction factor establishes the amount of reagent/degradation product A or B to be added to the system so as to restore the reaction stoichiometry.

In an alternative embodiment, said monitoring evaluates the levels of D, buffering with successive additions of B to maintain said levels within the range $D_{EFF}$, where said additions of B are established on the basis of said monitoring of $D_x$.

In an additional embodiment, said monitoring evaluates the levels D and adjusts the additions of D correcting the amount $\tau$ established a priori thanks to a factor $\epsilon$ defined comparing $D_x$ with $D_{EFF}$.

The adjustment based on pre-established parameters $\alpha$, $\beta$ and/or $\tau$ and a correction coefficient $\epsilon$ as defined above allows a punctual monitoring of the water contained in the circuit and prevents undesired exceedances of said threshold values $A_{MAX}$ and/or $B_{MAX}$ and/or deviations from the levels of substance D defined as efficient.

In addition, said adjustment based on two values, one functional to the plant parameters, one dependent on the punctual monitoring carried out, prevents undesired errors, for example the errors that would occur relating the adjustment exclusively to the monitoring, where erroneous measurements would entail errors in the measurement of the levels $A_x$ and consequent errors in the management of the amounts introduced in circulation.

In a preferred embodiment, said method comprises the following steps:
a) Providing a domestic hot water recirculation plant, where said plant is a system that is cyclically open or closed;
b) Providing a disinfectant substance D, where said disinfectant substance is obtained by a reaction of the type A+B→D or A+B+C→D, or A+B→C+D and the same disinfectant substance D undergoes a degradation reaction of the type D→A+B+$S_1$+ . . . +$S_n$ or D+B→A+$S_1$+ . . . +$S_n$;
c) Introducing said substance D, or reagents A+B, or A+B+C into the water circulating in said plant in a suitable stoichiometric ratio where said reaction of forming the disinfectant substance D takes place in the circulating water;
d) Periodically monitoring, directly and/or indirectly, the concentration levels of said reagent or degradation product A and/or of said reagent or degradation products B in the circulating water and comparing said measured levels $A_x$ and/or $B_x$ with the reference threshold levels, $A_{MAX}$ and/or $B_{MAX}$;
e) Periodically introducing said reagent/degradation product A or B in circulation in an amount of $(\alpha\pm\varepsilon)*V$ or $(\beta\pm\varepsilon)*V$, respectively where V, $\alpha$, $\beta$ and $\varepsilon$ have the meaning defined above.

In an additional embodiment, said method comprises, additionally or alternatively:
a) Providing a domestic hot water recirculation plant, where said plant is a system that is cyclically open or closed;
b) Providing a disinfectant substance D, where said disinfectant substance is obtained by a reaction of the type A+B→D or A+B+C→D, or A+B→C+D and the same disinfectant substance D undergoes a degradation reaction of the type D→A+B+$S_1$+ . . . +$S_n$ or D+B→A+$S_1$+ . . . +$S_n$;
c) Introducing said substance D, or reagents A+B, or A+B+C into the water circulating in said plant in a suitable stoichiometric ratio where said reaction of forming the disinfectant substance D takes place in the circulating water;
d) Periodically monitoring, directly and/or indirectly, the concentration levels of said substance D in the circulating water and comparing said measured levels $D_x$, with the reference threshold levels $D_{EFF}$;
e) Periodically introducing said disinfectant substance D in an amount of $(\tau\pm\varepsilon)*V$, where V, $\tau$ and $\varepsilon$ have the meaning defined above.

In a particularly preferred embodiment, said method comprises the direct and/or indirect monitoring of said degradation products and the direct and/or indirect monitoring of said disinfectant substance D.

Said monitoring is carried out with direct or indirect methods for measuring the levels of said reagents/by-products and/or of said substance D in the circuit that are known to the person skilled in the art. Said direct methods are preferably selected in the group that comprises colorimetric and amperometric methods. Said indirect methods comprise measuring one or more of the following chemical-physical parameters: the redox potential, pH, conductibility, temperature, hardness.

In a preferred embodiment, said direct monitoring of said decomposition products A and/or B, where said product is ammonium ions, comprises:
amperometric probes to detect the concentration of ammonium ions;
colorimetric probes to detect the concentration of ammonium ions.

In a still more preferred embodiment, said indirect monitoring of said decomposition products A and/or B, where said product is ammonium ions, comprises: Redox sensors (ORP, or oxidation reduction potential), where the measured Redox potential is correlated with the amount of ammonium ions present.

Said direct monitoring of said substance D, where said substance is monochloramine, comprises:
amperometric probes to detect total chlorine concentration,
colorimetric probes to detect total chlorine concentration,
amperometric probes to detect free chlorine concentration (or excess chlorine),
colorimetric probes to detect free chlorine concentration (or excess chlorine.

Said indirect monitoring of said substance D, where said substance D is monochloramine, comprises: Redox sensors (ORP, or oxidation reduction potential).

In a preferred embodiment, said monitoring takes place at intervals of 4 hours, preferably at intervals of 3 hours, even more preferably of 2 hours, or of 1 hour. In a preferred embodiment, said monitoring takes place continuously. In an alternative embodiment, said monitoring takes place with random periodicity within 24 hours.

Still more preferably, said monitoring takes place approximately at 9:00 PM, at 10:00 PM, at 11:00 PM, at 00:00 AM, at 3:00 AM, at 7:00 AM, at 8:00 AM, at 12:00 PM.

Said measurement detected with said monitoring is sent to a control unit that compares said measurement with the optimal parameter. On the basis of said comparison, the appropriate reagent is introduced in said system in the amount $(\tau\pm\varepsilon)*V$, or $(\alpha\pm\varepsilon)*V$ $(\beta\pm\varepsilon)*V$.

In a preferred embodiment, said introduction is carried out by an operator, present in proximity to the plant, who receives the parameters for a correct introduction from said control unit.

In an even more preferred embodiment, said introduction takes place automatically, by means of pumps that control the reagent tanks and that are controlled by the control unit.

According to an aspect of the invention, said method comprises:
a) Providing a hot-water recirculation system 1 according to FIG. 1 comprising:
an annular water duct 2,
a pump 3 connected to the annular duct 2 at a pumping point 4 to circulate the water in the annular duct 2,
heating means 5, such as an electric or gas boiler, connected to the annular duct 2 at a heating point 6 and configured to heat water as it passes through the heating point 6,
one or more withdrawal ducts 7 connected to the annular duct 2 at respective withdrawal points 8,
a supply duct 9 connected to the annular duct 2 at a supply point 10,
an electronic control system 12, such as a single central controller or two or more independent controllers, a monochloramine generator 13 in signal connection with the control system 12 and connected to the annular duct 2 at a disinfectant feed-in point 14, wherein the generator 13 is configured to synthesize monochloramine and add the synthesized monochloramine to water at the disinfectant feed-in point 14 of the annular duct 2, an ammonium ion reducer 15 in signal connection with the control system 12 and connected to the annular duct 2 at a reduction point 16, wherein the reducer 15 is configured to add chlorine or hypochlorites to the water at the reduction point 16 of the annular duct 2, ammonium detection means 17 in signal connection with the control system 12 and connected to the annular duct 2 at an ammonium detection point 18, the ammonium detection means 17 being configured to detect a magnitude representative of the concentration of ammonium ions in the water at the ammonium detection point 18 of the annular duct 2 and to transmit a corresponding ammonium concentration signal to the control system 12, wherein the control system 12 is configured to:

activate the monochloramine generator (13) and control the synthesis and addition of monochloramine, and activate the ammonium ion reducer 15 and control the addition of chlorine or hypochlorites as a function of the ammonium concentration signals, irrespective of the activation of the monochloramine generator 13;

b) monitoring, by measuring the redox potential, the $A_x$ levels of said ammonium ion and comparing, by means of said electronic control system 12, said measured levels $A_x$ with the reference threshold level $A_{MAX}$;

c) introducing into circulation, at predetermined times or continuously, monochloramine D, synthesized by said monochloramine generator 13, in an amount of $\tau^*V$;

d) introducing hypochlorite or chlorine into circulation, by means of said ammonium ion reducer 15, in an amount of βB corrected by a correction factor $\epsilon$, where said correction factor $\epsilon$ is determined by the δA detected by said monitoring as per e) according to the curve in FIG. 3, where the dotted line indicates the amount of B to be added over time.

The $A_x$ levels measured by said electronic control system 12 are compared thereby with the set threshold values $A_{MAX}$. Said electronic control system 12 processes the data by means of an algorithm that establishes whether and in what amount said reducer 15 has to introduce B into the annular duct 2. From said electronic control system 12, a direct signal is sent to the reducer 15 which, having received the input, introduces said reagent B into the annular duct 2.

In said embodiment, said fine control is fully automated.

In a preferred embodiment, said control system 12 is also in signal connection with an acoustic and/or visual alarm device 23.

Said control system 12 can be set so that, when said level $A_x$ exceeds said threshold level $A_{MAX}$, or exceeds a level defined as alarm level $A_{Alarm}$ said acoustic and/or visual alarm device 23 is activated.

Said acoustic and/or visual alarm device 23 can be in the form of a display that shows the pattern of said levels over time in the form of a curve, where for example said curve assumes a different colouring where the measured levels exceed said $A_{Alarm}$ level.

In an embodiment, said alarm signal is deactivated at the moment when said levels $A_x$ return below the alarm level $A_{Alarm}$.

It is clear that the above is also applicable when said detection means detect B and/or an additional degradation product and said reducer is a reducer of B and/or of said additional degradation product.

The present invention further relates to a control system that comprises at least two detection means 17 and one or more reducers 15, for one or more reagents/degradation products.

Said control system 12 is also configured to activate the D generator 13 and control the synthetization and addition of D, or to activate the dosing of D, or to activate the dosing of A and B in the circuit where the synthetization of D then takes place.

Preferably, more frequent monitoring after the introduction of said reagent A or B into the system evaluate the restoration of the levels below said threshold levels and, when necessary, from said control unit further instructions for further additions reach said operator.

In said method, said monitoring highlights a concentration of $A=A_x$. The control system, on the basis of $A_x$, defines the correction factor $\epsilon$ thus defining the amount of reagent B to be introduced into the circuit.

In a preferred embodiment, said disinfectant substance D is monochloramine, said reagent/degradation product A is ammonium ion and said reagent/degradation product B is hypochlorite, the level of said A in the water of the circuit is measured with the methods known to the person skilled in the art. Preferably, it is measured through the indirect measurement of the redox. At pre-established times, said monitoring is carried out and a procedure is started by the control unit for the introduction of hypochlorite (B) into the system.

In an additional preferred embodiment, said disinfectant substance D is chlorine dioxide, said reagent/degradation product A is sodium chlorite and its level in the water of the circuit is measured with methods known to the person skilled in the art. At pre-established times, said monitoring is carried out and a procedure is started by the control unit for the introduction into the system of hydrochloric acid B in an amount of $(\tau+\epsilon)^*V$, to restore the stoichiometry of the reaction to form the chlorine dioxide.

More preferably, where said levels of sodium chlorite exceed the threshold level $A_{MAX}$, said circuit 2 is opened so as to reduce the levels of old water contained therein, replacing them with fresh water with chlorine dioxide added.

In a particularly preferred embodiment, said disinfectant substance D is monochloramine and said method comprises the following steps:

a) Providing a domestic hot water recirculation plant, where said plant is a system that is cyclically open or closed, where the water that circulates in said plant is sanitized with monochloramine D;

b) Periodically monitoring the levels of concentration of the reagents/degradation products of said monochloramine, where said reagents/degradation products are: ammonium ion;

c) Comparing said levels with the threshold levels, where the threshold level for the ammonium ions is 0.5 mg/l d) Where the levels of one of said reagents/degradation products are above said threshold levels, the control central starts a procedure for the introduction of the appropriate reagent in circulation in an amount adapted to restore the reaction stoichiometry for the formation of said monochloramine.

By way of example, where said ammonium ion is present in an amount of 0.7 mg/l, the control unit starts a procedure for the introduction in circulation of hypochlorite in an appropriate amount, for example approximately 0.6 mg/l*V where V is the volume contained in said circuit.

Preferably, where said domestic hot water recirculation plant has a circadian opening/closing cyclicity, where said system is open during the day and closed in the evening, a cyclicity is established in the control system that allows a simplified operation of the plant.

In particular, after a period of constant monitoring, once the cyclicity of the variations and the components involved in said variations are defined, a dosing scheme is defined, indicating the times and the procedures for adding the reagents into the plant by the operator.

By way of example and with reference to the diagrams shown in FIG. 2, a typical basic dosing scheme for monochloramine is as follows:
a) from 8:00 AM to 8:00 PM: open plant. Continuous addition of monochloramine, where the amount of monochloramine added is τ, established on the basis of the plant parameters defined above and calibrated as a function of the amount of water drawn from the system;
b) at 10:00 PM, measurement of the levels of A, B and/or D in the circuit;
c) where said levels are outside the threshold levels, the system goes into alarm mode and the operating unit starts a procedure for the introduction into the system of A, B and/or D in an amount that takes into account said correction factor ε;
d) optionally, said operating unit removes said alarm signal from the system, after verifying that said levels are within the threshold values;
e) optionally, reiteration of said steps c), d) and e) at successive times during the night, until 8:00 AM.

The invention claimed is:

1. A method for dosing reagents in water disinfection plants, wherein said method comprises:
   a) Providing a plant comprising a circuit containing water, wherein said circuit is cyclically open or closed;
   b) Providing a disinfectant substance D and reagents A and B, wherein said disinfectant substance D is obtained by a reaction of the type A+B→D, and the disinfectant substance D undergoes a degradation reaction of the type D→A+B+$S_1$+ ... +$S_n$, or D+B→A+$S_1$+ ... +$S_n$;
   c) Introducing said substance D, or said reagents A+B into the water circulating in said plant in a stoichiometric ratio wherein said reaction of forming the disinfectant substance D takes place in the circulating water;
   d) Periodically monitoring, directly and/or indirectly, the concentration levels of said reagent A and/or of said reagent B and/or of said disinfectant substance D in the circulating water and comparing said measured levels, defined as $A_x$ and/or $B_x$ and/or $D_x$, with the reference threshold levels, defined as $A_{MAX}$ and/or $B_{MAX}$ and/or $D_{EFF}$;
   e) Periodically introducing said reagent A or B in circulation in an amount of $(\alpha\pm\varepsilon)*V$ and/or $(\beta\pm\varepsilon)*V$, respectively, or said disinfectant substance D in an amount of $(\tau\pm\varepsilon)*V$, where V is the total volume of water contained in the circuit when closed, α indicates the concentration of A, β indicates the concentration of B, and τ indicates the concentration of D, as determined in advance as a function of the following parameters: plant volume and/or plant usage frequency and/or characteristics of the fresh water introduced therein; ε is a correction factor determined after said comparison of $A_x$ to $A_{MAX}$ and/or $B_x$ and $B_{MAX}$ and/or $D_x$ and $D_{EFF}$;
   wherein said correction factor ε modifies said concentrations α, β, τ by no more than 10%; and
   wherein said disinfectant substance D is chlorine dioxide, said monitoring is carried out for the reagent A, which consists of sodium chlorite, and the further reagent B is hydrochloric acid.

2. The method according to claim 1, wherein said monitoring takes place at intervals of 4 hours, or 3 hours, or 2 hours, or 1 hour.

3. The method according to claim 1, wherein said monitoring takes place approximately at the times consisting of at 9:00 PM, at 10:00 PM, at 11:00 PM, at 00:00 AM, at 3:00 AM, at 7:00 AM, at 8:00 AM, at 12:00 PM.

4. A method for dosing reagents in water disinfection plants, wherein said method comprises:
   providing a hot water recirculation system comprising:
   an annular water duct,
   a pump connected to the annular duct at a pumping point to circulate the water in the annular duct,
   heating means comprising an electric or gas boiler, connected to the annular duct at a heating point and configured to heat water as the water passes through the heating point,
   one or more withdrawal ducts connected to the annular duct at respective withdrawal points,
   a supply duct connected to the annular duct at a supply point,
   an electronic control system comprising a single central controller or two or more independent controllers,
   a monochloramine generator in signal connection with the control system and connected to the annular duct at a disinfectant feed-in point, wherein the generator is configured to synthesize monochloramine and add the synthesized monochloramine to water at the disinfectant feed-in point of the annular duct,
   an ammonium ion reducer in signal connection with the control system and connected to the annular duct at a reduction point, wherein the reducer is configured to add chlorine or hypochlorites to water at the reduction point of the annular duct,
   ammonium detection means in signal connection with the control system and connected to the annular duct at an ammonium detection point, the ammonium detection means being configured to detect a magnitude representative of the concentration of ammonium ions in water at the ammonium detection point of the annular duct and transmit a corresponding ammonium concentration signal to the control system, wherein the control system is configured to:
   activate the monochloramine generator and control the synthesis and addition of monochloramine, and
   activate the ammonium ion reducer and control addition of chlorine or hypochlorites as a function of the ammonium concentration signals, irrespective of the activation of the monochloramine generator;
   monitoring, by measuring redox potential, the levels of said ammonium ion and comparing said measured levels, defined as $A_x$, by means of said electronic control system, with the reference threshold level, defined as $A_{MAX}$;
   introducing into circulation, at predetermined times or continuously, monochloramine, synthesized by said monochloramine generator, in an amount of τ*V, where V is a total volume of water contained in the recirculation system when closed, and τ represents concentration of monochloramine as determined in advance as a function of the following parameters:

plant volume and/or plant usage frequency and/or characteristics of fresh water introduced therein;

introducing into circulation hypochlorite or chlorine, by said ammonium ion reducer, in an amount of $\beta B$ corrected by a correction factor $\tau$, where $\beta B$ represents concentration of hypochlorite or chlorine as determined in advance as a function of the following parameters: plant volume and/or plant usage frequency and/or characteristics of the fresh water introduced therein, and said correction factor c is determined after comparison of $A_x$ to $A_{MAX}$.

5. A method for dosing reagents in water disinfection plants, wherein said method comprises:

providing a hot water recirculation system comprising:
an annular water duct,
a pump connected to the annular duct at a pumping point to circulate the water in the annular duct,
heating means comprising an electric or gas boiler, connected to the annular duct at a heating point and configured to heat water as the water passes through the heating point,
one or more withdrawal ducts connected to the annular duct at respective withdrawal points,
a supply duct connected to the annular duct at a supply point,
an electronic control system comprising a single central controller or two or more independent controllers,
an ammonium ion tank in signal connection with the control system and connected to the annular duct at an ammonium ion feed-in point, wherein the tank is configured to add ammonium ions to the water at the ammonium ion feed-in point of the annular duct,
an ammonium ion reducer in signal connection with the control system and connected to the annular duct at a reduction point, wherein the reducer is configured to add chlorine or hypochlorites to the water at the reduction point of the annular duct,
monochloramine detection means in signal connection with the control system and connected to the annular duct at a monochloramine detection point, the monochloramine detection means being configured to detect a magnitude representative of the concentration of monochloramine in water at the monochloramine detection point of the annular duct, and transmit a corresponding monochloramine concentration signal to the control system, wherein the control system is configured to:

activate the ammonium ion tank and control addition of ammonium ions, and activate the ammonium ion reducer and control addition of chlorine or hypochlorites as a function of the monochloramine concentration signals, irrespective of activation of the ammonium ion tank;

monitoring, by measuring redox potential, the concentration levels of said monochloramine and comparing said measured levels, defined as $D_x$, by said electronic control system, with the reference threshold levels, defined as $D_{EFF}$;

introducing into circulation, at predetermined times or continuously, ammonium ions A and chlorine or hypochlorites B, in an amount of $\alpha*V$ and $\beta B*V$, respectively, where V is a total volume of water contained in the recirculation system when closed, $\alpha$ represents the concentration of ammonium ions A, and $\beta B$ represents the concentration of chlorine or hypochlorites B, as determined in advance as a function of the following parameters: plant volume and/or plant usage frequency and/or characteristics of the fresh water introduced therein, said amounts being corrected by a correction factor $\varepsilon$, determined by the $D_x$ detected by said monitoring.

* * * * *